United States Patent
Chae et al.

(10) Patent No.: US 10,960,295 B2
(45) Date of Patent: Mar. 30, 2021

(54) CONTENT DISPLAY METHOD AND ELECTRONIC DEVICE FOR PERFORMING SAME

(71) Applicant: Samsung Electronics Co., Ltd., Suwon-si (KR)

(72) Inventors: Sang Won Chae, Seoul (KR); Jung Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/064,781

(22) PCT Filed: Nov. 14, 2016

(86) PCT No.: PCT/KR2016/013103
§ 371 (c)(1),
(2) Date: Jun. 21, 2018

(87) PCT Pub. No.: WO2017/122920
PCT Pub. Date: Jul. 20, 2017

(65) Prior Publication Data
US 2018/0373373 A1    Dec. 27, 2018

(30) Foreign Application Priority Data
Jan. 13, 2016   (KR) .................. 10-2016-0004037

(51) Int. Cl.
*G06F 3/041*   (2006.01)
*A63F 13/21*   (2014.01)
(Continued)

(52) U.S. Cl.
CPC .............. *A63F 13/21* (2014.09); *A63F 13/25* (2014.09); *A63F 13/50* (2014.09);
(Continued)

(58) Field of Classification Search
CPC ........ G02B 27/0101; G02B 2027/0123; A63F 13/50; A63F 13/21; A63F 13/25;
(Continued)

(56) References Cited

U.S. PATENT DOCUMENTS 5,982,392 A   11/1999 Anfossi et al.
6,141,022 A   10/2000 Anfossi et al.
(Continued)

FOREIGN PATENT DOCUMENTS

CN   101501624 A   8/2009
CN   101918921 A   12/2010
(Continued)

OTHER PUBLICATIONS

European Search Report dated Sep. 13, 2018, issued in European Patent Application No. 16885231.7.
(Continued)

*Primary Examiner* — Christopher E Leiby
(74) *Attorney, Agent, or Firm* — Jefferson IP Law, LLP

(57) ABSTRACT

An electronic device disclosed herein may comprise: a communication circuit for establishing communication with an external electronic device; a memory for storing information on graphic source data of a content and a plurality of graphic rendering schemes for displaying the content; and a processor functionally connected to the communication circuit and the memory. The processor may be configured to select at least one graphic rendering scheme on the basis of the status of the electronic device or the external electronic device, and display the content on a display functionally connected to the electronic device, using the at least one graphic rendering scheme. Various other embodiments recognized from the specification are also possible.

11 Claims, 9 Drawing Sheets

(51) Int. Cl.
    *G06T 15/00*     (2011.01)
    *H04N 21/44*     (2011.01)
    *A63F 13/50*     (2014.01)
    *A63F 13/25*     (2014.01)
    *H04N 13/30*     (2018.01)
    *G02B 27/01*     (2006.01)
    *G06F 3/01*     (2006.01)
    *G06F 3/14*     (2006.01)

(52) U.S. Cl.
    CPC .......... *G02B 27/0101* (2013.01); *G06F 3/012* (2013.01); *G06F 3/013* (2013.01); *G06F 3/0412* (2013.01); *G06F 3/14* (2013.01); *G06T 15/00* (2013.01); *H04N 13/30* (2018.05); *H04N 21/44* (2013.01); *G02B 2027/0123* (2013.01); *G09G 2370/06* (2013.01); *G09G 2370/10* (2013.01)

(58) Field of Classification Search
    CPC .......... G06F 3/14; G06F 3/0416; G06F 3/013; G06F 3/012; G06F 3/0412; H04N 13/30; H04N 21/44; G06T 15/00; G09G 2370/10; G09G 2370/06
    See application file for complete search history.

(56) References Cited

U.S. PATENT DOCUMENTS

| | | | |
|---|---|---|---|
| 8,681,159 | B2 | 3/2014 | Culbert et al. |
| 8,957,835 | B2 | 2/2015 | Hoellwarth |
| 9,047,835 | B2 | 6/2015 | Bennett |
| 9,075,561 | B2 | 7/2015 | Sarnoff |
| 9,113,053 | B2 | 8/2015 | Kim et al. |
| 9,207,853 | B2 | 12/2015 | Lee et al. |
| 9,429,759 | B2 | 8/2016 | Hoellwarth |
| 9,482,869 | B2 | 11/2016 | Hoellwarth |
| 9,595,237 | B2 | 3/2017 | Hoellwarth |
| 9,621,477 | B2 | 4/2017 | Hwang |
| 9,646,573 | B2 | 5/2017 | Hoellwarth |
| 9,646,574 | B2 | 5/2017 | Hoellwarth |
| 9,746,671 | B2 | 8/2017 | Fujigaki |
| 9,749,451 | B2 | 8/2017 | Hoellwarth |
| 10,096,083 | B2 | 10/2018 | Yang et al. |
| 2009/0189890 | A1* | 7/2009 | Corbett .................. G06F 9/505 345/419 |
| 2009/0189891 | A1 | 7/2009 | Rivera et al. |
| 2009/0300203 | A1* | 12/2009 | Virdi .................. H04N 21/2358 709/231 |
| 2010/0079356 | A1* | 4/2010 | Hoellwarth .......... G02B 27/017 345/8 |
| 2012/0159340 | A1 | 6/2012 | Bae et al. |
| 2013/0007202 | A1 | 1/2013 | Lee et al. |
| 2013/0027404 | A1 | 1/2013 | Sarnoff |
| 2013/0241942 | A1* | 9/2013 | Bennett ..................... G06F 3/14 345/520 |
| 2014/0043658 | A1 | 2/2014 | Kim et al. |
| 2014/0237120 | A1 | 8/2014 | Hwang |
| 2014/0282751 | A1 | 9/2014 | Lee et al. |
| 2015/0074233 | A1 | 3/2015 | Won et al. |
| 2015/0117839 | A1* | 4/2015 | Oberbrunner ........ H04N 21/234 386/280 |
| 2015/0198811 | A1 | 7/2015 | Hoellwarth |
| 2015/0288511 | A1* | 10/2015 | Oh ........................ H04L 7/0332 375/343 |
| 2015/0324058 | A1 | 11/2015 | Sarnoff |
| 2016/0085076 | A1 | 3/2016 | Hoellwarth |
| 2016/0327799 | A1 | 11/2016 | Hoellwarth |
| 2016/0365064 | A1 | 12/2016 | Hoellwarth |
| 2017/0011716 | A1 | 1/2017 | Hoellwarth |
| 2017/0187855 | A1 | 6/2017 | Hoellwarth |
| 2018/0063307 | A1 | 3/2018 | Hoellwarth |
| 2018/0084093 | A1 | 3/2018 | Hoellwarth et al. |
| 2018/0097920 | A1 | 4/2018 | Hoellwarth et al. |

FOREIGN PATENT DOCUMENTS

| | | |
|---|---|---|
| CN | 103891269 A | 6/2014 |
| CN | 103995738 A | 8/2014 |
| CN | 105096373 A | 11/2015 |
| EP | 2 560 091 A2 | 2/2013 |
| EP | 2 767 905 A1 | 8/2014 |
| JP | 2014-157604 A | 8/2014 |
| KR | 10-2013-0001826 A | 1/2013 |
| KR | 10-2014-0038681 A | 3/2014 |
| KR | 10-2014-0066270 A | 6/2014 |
| KR | 10-2015-0028588 A | 3/2015 |

OTHER PUBLICATIONS

Chinese Office Action dated Jan. 6, 2020, issued in a counterpart Chinese Application No. 201680077958.8.

* cited by examiner

CONTENT DISPLAY METHOD AND ELECTRONIC DEVICE FOR PERFORMING SAME

TECHNICAL FIELD

Embodiments of the present disclosure disclosed herein relate to a method for displaying contents, based on interworking between a plurality of electronic devices, and to an electronic device for performing the same.

BACKGROUND ART

In recent years, electronic devices have been implemented in a form that can be easily carried by a user or can be directly worn on a user's body. These electronic devices may be generally called a portable electronic device or a wearable electronic device. The portable electronic device may include, for example, a mobile phone, a smartphone, a tablet PC, or the like. The wearable electronic device may include, for example, a head-mounted display (HMD), smart glasses, a smart watch or wristband, a clothing-type device, or the like.

Generally, the portable electronic device or the wearable electronic device may interact with another electronic device through a specified communication channel. The portable electronic device or the wearable electronic device may ensure functionality intended by a device maker (or a third party), based on the interaction with the other electronic device.

DISCLOSURE

Technical Problem

The portable electronic device or the wearable electronic device may need a considerable level of down-sizing, low-power consumption, and light weight for portability or wearability. Therefore, computing resources, network resources, or power resources of the portable electronic device or the wearable electronic device may be very limited.

Aspects of the present disclosure are to address at least the above-mentioned problems and/or disadvantages and to provide at least the advantages described below. Accordingly, an aspect of the present disclosure is to provide a method for displaying contents, based on interworking between a plurality of electronic devices while efficiently using the limited resources, and to provide an electronic device for performing the same. For example, an aspect of the present disclosure is to provide a method for dynamically changing graphic rendering schemes, based on status parameters of the plurality of electronic devices in a case where the plurality of electronic devices share contents, and to provide an electronic device for performing the same.

Technical Solution

In accordance with an aspect of the present disclosure, an electronic device disclosed herein includes a communication circuit that establishes communication with an external electronic device, a memory that stores graphic source data of contents and information about a plurality of graphic rendering schemes for displaying the contents, and a processor operatively connected to the communication circuit and the memory. The processor selects at least one of the plurality of graphic rendering schemes, based on a status of the electronic device or the external electronic device and displays the contents on a display operatively connected to the electronic device, by using the at least one graphic rendering scheme.

In accordance with another aspect of the present disclosure, provided is a method implemented with a processor, in which an electronic device includes the processor, a communication module, and a memory for storing information about a plurality of graphic rendering schemes, the method including establishing communication with an external electronic device by using the communication module, selecting at least one of the plurality of graphic rendering schemes, based on a status of the electronic device and the external electronic device, by using the processor, and displaying contents on a display operatively connected to the electronic device, by using the at least one graphic rendering scheme.

In accordance with another aspect of the present disclosure, a computer-readable storage medium stores an instruction that, when executed, causes at least one processor to establish communication with an external electronic device, to select at least one graphic rendering scheme, based on a status of the electronic device and the external electronic device, and to display contents on a display operatively connected to the electronic device, by using the at least one graphic rendering scheme.

Other aspects, advantages, and salient features of the disclosure will become apparent to those skilled in the art from the following detailed description, which, taken in conjunction with the annexed drawings, discloses various embodiments of the present disclosure.

Advantageous Effects

According to embodiments of the present disclosure, an electronic device may dynamically decide the most suitable graphic rendering scheme, based on a status (e.g., a specification, a thermal status, an overload status, a communication status, or a combination thereof) of the electronic device and/or an external device. In addition, the present disclosure may provide various effects that are directly or indirectly recognized.

MODE FOR INVENTION

Figure 1A:
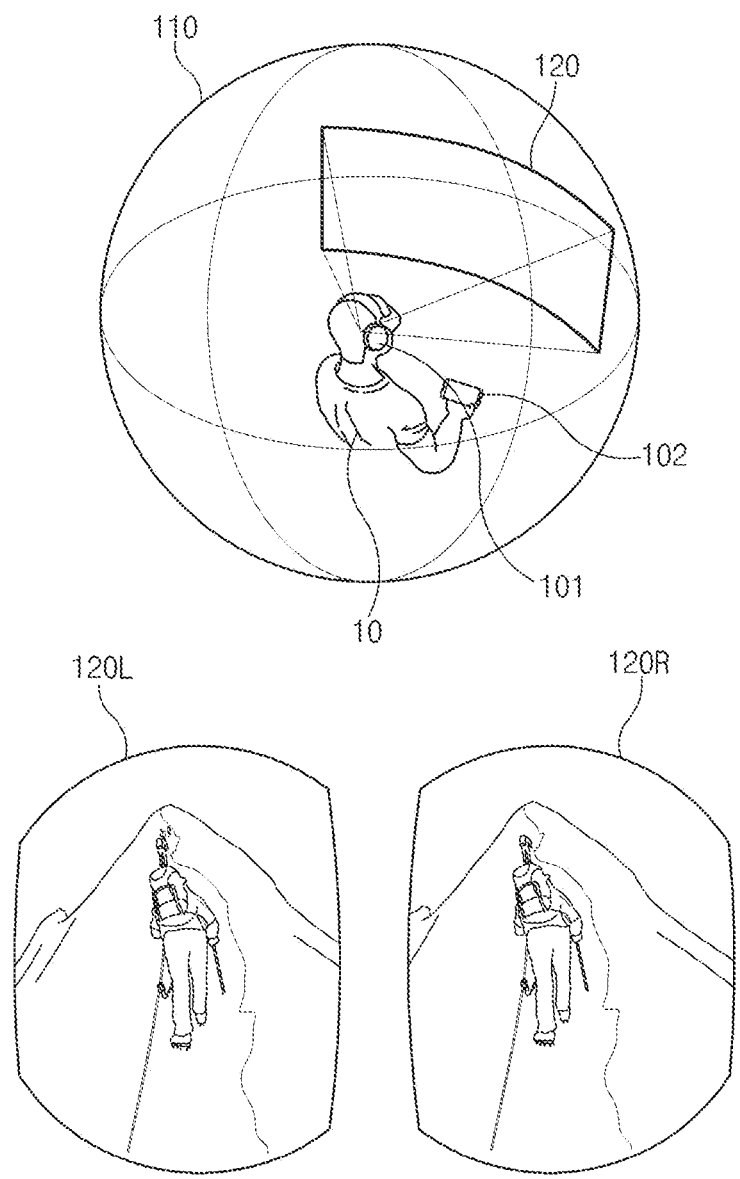
FIG. 1A illustrates an environment to which various embodiments of the present disclosure are applied.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or Play Station™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies. In this disclosure, the term "user" may refer to a person who uses an electronic device or may refer to a device (e.g., an artificial intelligence electronic device) that uses the electronic device.

Hereinafter, electronic devices according to various embodiments will be described with reference to the accompanying drawings. In this disclosure, for the convenience of description, an electronic device (e.g., also referred to as a first electronic device, a second electronic device, an external device, an external electronic device, or the like) will be described as corresponding to a head-mounted display (HMD) or a smartphone. According to an embodiment, the electronic device may also be described as being included as a part of the head-mounted display. However, the electronic device to which various embodiments of the present disclosure are applied is not limited thereto, and various embodiments of the present disclosure may also be applied to the above-described various forms of electronic devices.

FIG. 1A illustrates an environment to which various embodiments of the present disclosure are applied.

Referring to FIG. 1A, in the environment to which various embodiments of the present disclosure are applied, a user 10 may have a first electronic device 101 (e.g., a head-mounted display) mounted on the head and a second electronic device 102 (e.g., a smartphone) held by a hand. The first electronic device 101 and the second electronic device 102 may interact with each other through a specified communication channel (e.g., Bluetooth, Wi-Fi Direct, or the like).

The first electronic device 101 may provide an image 120 (e.g., a stereoscopic image) corresponding to a field of view (FoV) in a virtual space 110 to the user 10 having the first electronic device 101 mounted on the head. For example, a display included in the first electronic device 101 may display a left-eye image screen 120L and a right-eye image screen 120R that correspond to the image 120.

The image 120 may correspond to, for example, an image implemented by binocular disparity between the left-eye image 120L and the right-eye image 120R. The first electronic device 101 may provide the image 120 having a 3D effect (or depth) to the user 10 through the pair of 2D images 120L and 120R, based on a visual angle difference between the two eyes. The user 10 may view the pair of 2D images 120L and 120R close to the two eyes and may thus have more realistic user experience.

For example, the first electronic device 101 may be connected to the second electronic device 102 through a specified network. The first electronic device 101 and the second electronic device 102 may exchange various data through the network. For example, the first electronic device 101 and the second electronic device 102 may share information (e.g., user input information, motion information, head tracking information, gaze information, or the like) detected thereby or input by the user 10. For example, the first electronic device 101 and the second electronic device 102 may specify the image 120, based on the shared information.

Figure 1B:
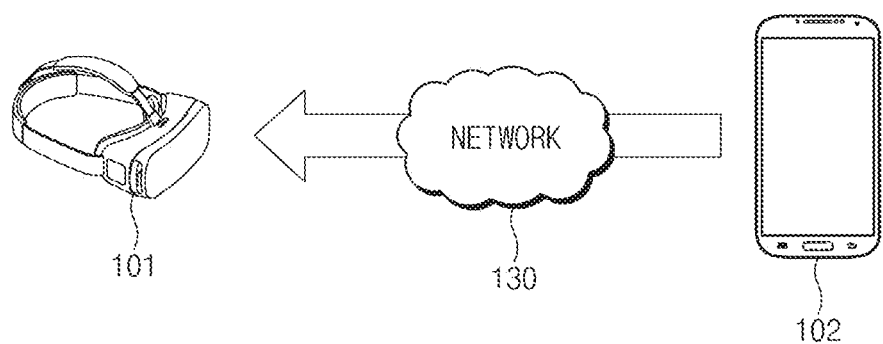
FIG. 1B illustrates electronic devices to which various embodiments of the present disclosure are applied.

FIG. 1B illustrates electronic devices to which various embodiments of the present disclosure are applied.

Referring to FIG. 1B, various embodiments of the present disclosure may be implemented between the first electronic device 101 and the second electronic device 102. The first electronic device 101 and the second electronic device 102 may be in communication with each other through, for example, a network 130.

As illustrated in FIG. 1B, the first electronic device 101 may correspond to a head-mounted display, the second electronic device 102 may correspond to a smartphone, and the network 130 may correspond to a short-range communication network. However, the present disclosure is not limited thereto. For example, the first electronic device 101 may correspond to a smartphone, a tablet PC, a laptop PC, a desktop PC, a smart TV, or the like, and the second electronic device 102 may correspond to a smartphone, a tablet PC, a laptop PC, a desktop PC, a TV box, a server, or the like. The network 30 may correspond to a cellular network or a wired network (e.g., a wired network through a USB connection, an HDMI connection, an RS-232 connection, or the like).

According to an embodiment, graphic source data for rendering the left-eye image 120L and the right-eye image 120R of FIG. 1A may be stored in an internal/external memory of the first electronic device 101.

For example, in the case where the graphic source data is stored in the internal/external memory of the first electronic device 101, a processor of the first electronic device 101 may compile or convert the graphic source data to generate a graphic command (e.g., a graphic language (GL) command). For example, the processor may execute or decode the graphic command to generate data to be provided to the display. The display may display contents (e.g., the left-eye image 120L and the right-eye image 120R of FIG. 1A), for example, by using the generated data (a first graphic rendering scheme).

In the first graphic rendering scheme, the processor of the first electronic device 101 may process the graphic source data by using only computing resources thereof and may display corresponding contents on the display. In this case, the data processing may be performed at relatively high speed since graphic operations are performed in one terminal.

However, in this case, the first electronic device 101 may use a large amount of computing resources although using fewer retained network resources. Therefore, an overload status for data processing may rapidly increase in the processor of the first electronic device 101, and the processor is likely to be overheated correspondingly. In addition, it may be difficult or impossible to process the graphic source data in the case where the performance of the processor of the first electronic device 101 is insufficient.

According to another embodiment, graphic source data for rendering the left-eye image 120L and the right-eye image 120R of FIG. 1A may be stored in an internal/external memory of the second electronic device 102.

For example, a processor of the second electronic device 102 may transmit data generated based on the graphic source data (e.g., data generated by executing a graphic command that is generated by compiling and converting the graphic source data) to the first electronic device 101. The processor of the first electronic device 101 may display contents (e.g., the left-eye image 120L and the right-eye image 120R of FIG. 1A) on the display by using the received data (a second graphic rendering scheme).

In the second graphic rendering scheme, the processor of the first electronic device 101 may use very few computing resources since the processor of the first electronic device 101 renders the contents on the display, based on the data received from the second electronic device 102. However, in this case, the data transmission may use a large amount of network resources, similarly to video streaming, in the first electronic device 101. Therefore, a bottleneck may be created in the first electronic device 101, and thus the first electronic device 101 may have difficulty in ensuring a bandwidth for the data transmission. In addition, image interruption or delay may take place in the first electronic device 101, for example, in the case where the communication quality of the network between the first electronic device 101 and the second electronic device 102 is poor or the communication traffic of the network is high.

According to another embodiment, graphic source data for rendering the left-eye image 120L and the right-eye image 120R of FIG. 1A may be stored in internal/external memories of the first and second electronic devices 101 and 102.

For example, the processor of the second electronic device 102 may compile and convert the graphic source data stored in the device thereof to generate a graphic command and may transmit the generated graphic command to the first electronic device 101. The processor of the first electronic device 101 may display contents (e.g., the left-eye image 120L and the right-eye image 120R of FIG. 1A) on the display by executing the received graphic command (a third graphic rendering scheme).

In the third graphic rendering scheme, the processor of the first electronic device 101 may render the contents on the display by executing the graphic command received from the second electronic device 102. The graphic command may correspond to, for example, control information used to render a predetermined image on the display. The graphic command may have a significantly smaller amount of information than the data transmitted in the second graphic rendering scheme since the graphic command has the substance of control information. The processor of the first electronic device 101 may display the contents (e.g., images) on the display by using data (e.g., texture information, image information, and the like of the contents) stored in the internal/external memory according to the graphic command.

The third graphic rendering scheme may consume fewer computing resources than the first graphic rendering scheme and may consume fewer network resources than the second graphic rendering scheme. Accordingly, the first electronic device 101 may make up for weaknesses (e.g., excessive use of computing resources or network resources) of the first graphic rendering scheme and the second graphic rendering scheme.

According to various embodiments, the first electronic device 101 may combine at least some of the first to third graphic rendering schemes. For example, the first electronic device 101 may render the left-eye image 120L of FIG. 1A by using the first graphic rendering scheme and may render the right-eye image 120R by using the second graphic rendering scheme. In another example, the first electronic device 101 may render the left-eye image 120L of FIG. 1A by using the second graphic rendering scheme and may render the right-eye image 120R by using the third graphic rendering scheme. The schemes to render the left-eye image 120L and the right-eye image 120R may be combined in various ways, in addition to the above-described examples.

As described above, the first electronic device 101 according to various embodiments of the present disclosure may display contents on the display by using the various graphic rendering schemes (e.g., the first to third graphic rendering schemes). An electronic device (e.g., the first electronic device 101) according to various embodiments of the present disclosure may decide at least one of the various graphic rendering schemes, based on a status (e.g., a specification, a thermal status, an overload status, a communication status, or a combination thereof) of the electronic device or an external electronic device (e.g., the external electronic device 102) connected thereto. Accordingly, the electronic device may decide and use a graphic rendering scheme most suitable for a driving status of the electronic device while making up for weaknesses of each rendering scheme.

Hereinafter, external and internal configurations of a head-mounted display (e.g., the first electronic device 101) will be described with reference to FIGS. 2 and 3. A configuration of an electronic device that is mounted on the head-mounted display (e.g., the first electronic device 101) as a separate device, is included in the head-mounted display (e.g., the first electronic device 101) as a part, or corresponds to the second electronic device 102 will be described with reference to FIGS. 4 and 5. In addition, a contents display method of an electronic device according to various embodiments of the present disclosure will be described with reference to FIGS. 6 and 7.

Figure 2:
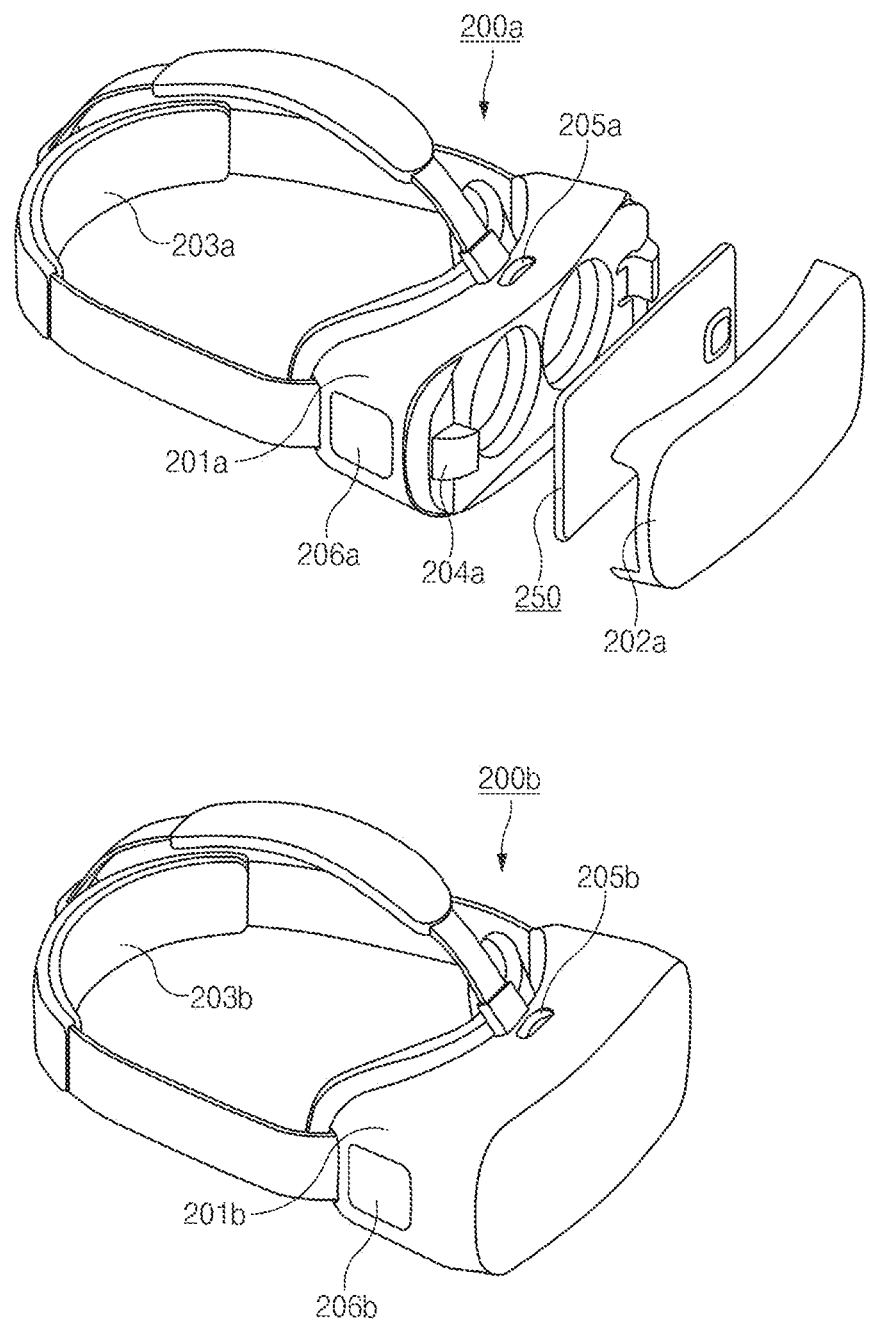
FIG. 2 illustrates a head-mounted display according to various embodiments of the present disclosure.

FIG. 2 illustrates a head-mounted display according to various embodiments of the present disclosure.

Referring to FIG. 2, external configurations of head-mounted displays 200a and 200b according to various embodiments of the present disclosure are illustrated. The head-mounted displays 200a and 200b may correspond to, for example, the first electronic device 101 illustrated in FIGS. 1A and 1B.

For example, the head-mounted display 200a may differ from the head-mounted display 200b in that the former has an electronic device 250 (e.g., a smartphone) mounted therein. For example, the head-mounted display 200a may be electrically or operatively coupled with the electronic device 250, which has an ability to implement an image, to use resources of the electronic device 250.

In another example, the head-mounted display 200b may have an ability to independently implement a display (what is called "stand-alone", that is, the electronic device 250 is not separately mounted in the head-mounted display 200b). The head-mounted display 200b may include, for example, at least some elements included in the head-mounted display 200a and the electronic device 250.

In regard to the head-mounted display 200b, descriptions of elements (e.g., 201b, 203b, 205b, and the like) that correspond to those of the head-mounted display 200a are omitted. In addition, a configuration of the electronic device 250 mounted in the head-mounted display 200a will be described with reference to FIGS. 4 and 5.

According to an embodiment, the head-mounted display 200a may include a main frame 201a, a cover 202a, and a mounting member 203a.

The main frame 201a may have a space formed therein in which the electronic device 250 is accommodated. The main frame 201a may include a connector 204a, a display position adjustment unit 205a, or an input unit 206a. According to an embodiment, the main frame 201a may further include non-illustrated elements (e.g., a lens adjustment unit).

The connector 204a may be coupled with a connector (e.g., a USB interface) of the electronic device 250. The head-mounted display 200a and the electronic device 250 may interact with each other by the coupling.

The display position adjustment unit 205a may be an element for moving a display of the electronic device 250 to a suitable position for a user to view the display. The display position adjustment unit 205a may be implemented in hardware or software, and a plurality of display position adjustment units 205a may be provided on the exterior of the main frame 201a.

The input unit 206a may be a user interface, and the user may control a graphical user interface (GUI) of the electronic device 250 through the input unit 206a. The input unit 206a may be provided on a surface (e.g., a side surface) of the main frame 201a and may correspond to a touch pad capable of receiving a touch input (e.g., a direct touch input or a hovering input).

An input through the input unit 206a may be transmitted to the electronic device 250, and the electronic device 250 may provide a corresponding function in response to the input. For example, the user may perform a touch input on the touch pad to adjust the sound of contents or control the reproduction of an image. The input unit 206a may include a physical button, a touch key, a joystick, or a wheel key, in addition to the touch pad, and a plurality of input units 206a may be provided.

The cover 202a may be secured to the main frame 201a to cover the space in which the electronic device 250 is accommodated.

The mounting member 203a for wearing the head-mounted display 200a on a part (e.g., the head) of the user's body may be connected to the main frame 201a. For example, the mounting member 203a may include a band, a Velcro tape, or the like that is formed of an elastic material. The main frame 201a may be held closer to the user's eyes by the mounting member 203a. According to various embodiments, the mounting member 203a may be implemented with eyeglass temples, a helmet, straps, or the like.

Figure 3:
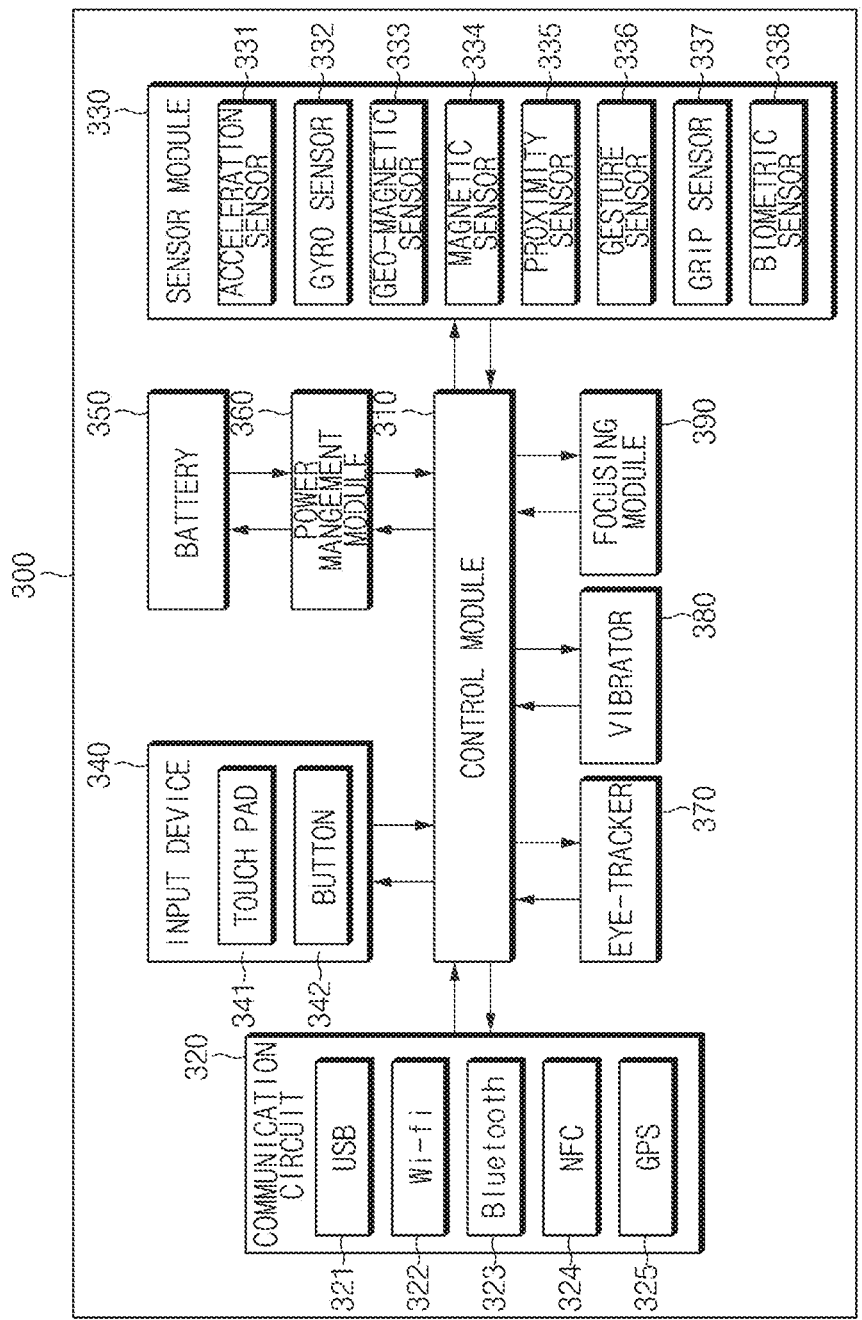
FIG. 3 illustrates an internal configuration of a head-mounted display according to an embodiment of the present disclosure.

FIG. 3 illustrates an internal configuration of a head-mounted display according to an embodiment of the present disclosure.

Referring to FIG. 3, a head-mounted display 300 may correspond to, for example, an internal configuration of the head-mounted display 200a of FIG. 2. The head-mounted display 200b illustrated in FIG. 2 may further include at least some elements illustrated in FIG. 4 or 5, in addition to elements illustrated in FIG. 3.

The head-mounted display 300 may include a control module 310, a communication circuit 320, a sensor module 330, an input device 340, a battery 350, a power management module 360, an eye tracker 370, a vibrator 380, and a focusing module (adjustable optics) 390 (or a lens assembly). According to various embodiments, some of the elements of the head-mounted display 300 may be included in an electronic device (e.g., the electronic device 250 of FIG. 2) connected through the communication circuit 320.

The control module (or processor) 310 may include, for example, a processor or a micro controller unit (MCU). The control module 310 may drive an operating system (OS) or an embedded S/W program to control functions of the plurality of elements connected to the control module 310.

The communication circuit 320 may connect the head-mounted display 300 and the electronic device (e.g., the electronic device 250 of FIG. 2) through a wired and/or wireless communication network to perform data transmission/reception. According to an embodiment, the communication circuit 320 may include a USB module 321, a Wi-Fi module 322, a Bluetooth module 323, an NFC module 324, and a GPS module 325. According to an embodiment, at least one (e.g., two or more) of the Wi-Fi module 322, the Bluetooth module 323, the NFC module 324, and the GPS module 325 may be included in an Integrated Circuit (IC) or an IC package.

The sensor module 330 may measure a physical quantity or detect an operating status of the head-mounted display 300 and may convert the measured or detected information into an electrical signal. For example, the sensor module 330 may include at least one of an acceleration sensor 331, a gyro sensor 332, a geo-magnetic sensor 333, a magnetic sensor 334, a proximity sensor 335, a gesture sensor 336, a grip sensor 337, and a biometric sensor 338.

For example, the acceleration sensor 331, the gyro sensor 332, and the geo-magnetic sensor 333 may detect a motion of the head of a user that has the head-mounted display 300 on (what is called head tracking). In addition, the proximity sensor 335 or the grip sensor 337 may detect whether the head-mounted display 300 is worn on the user's body. Whether the head-mounted display 300 is worn on the user's body may also be detected through the recognition of infrared light, pressure, or a change of capacitance (or a dielectric constant). The gesture sensor 336 may detect a motion of a hand or finger of the user and may convert the motion into a user input signal. The biometric sensor 338 may include, for example, an E-nose sensor, an EMG sensor, an EEG sensor, an ECG sensor, an iris sensor, or the like.

Meanwhile, according to an embodiment, the sensor module 330 may further include a control circuit for controlling the various sensors, and at least some sensors of the sensor module 330 may be included in the electronic device (e.g., the electronic device 250) mounted in the head-mounted display 300.

The input device 340 may include a touch pad, a button, or the like. The touch pad may recognize a touch input by at least one of, for example, capacitive, resistive, infrared, and ultrasonic detecting methods. Furthermore, the touch pad may further include a control circuit. In the case where the touch pad is of a capacitive type, the touch pad may recognize physical contact or proximity. The touch pad may further include a tactile layer. In this case, the touch pad may provide a tactile response to the user. The button may include, for example, a physical button, an optical key, or a keypad.

The battery 350 may supply power to each element of the head-mounted display 300. The battery 350 may control the supply of power to each element of the head-mounted display 300 through the power management module 360. The battery 350 may be included in a battery embedded in the electronic device (e.g., the electronic device 250 of FIG. 2) and may also be independently included in the head-mounted display 300.

The eye-tracker 370 may track the user's gaze by using at least one of, for example, an electrical oculography (EOG) sensor, a coil system, a dual purkinje system, a bright pupil system, and a dark pupil system. Furthermore, the eye-tracker 370 may further include a micro camera for tracking the user's gaze.

The focusing module 390 may measure an inter-pupil distance (IPD) of the user to adjust a distance between lenses and the position of a display of the electronic device (e.g., the electronic device 250), thereby enabling the user to view an image suitable for the user's physical condition.

Figure 4:
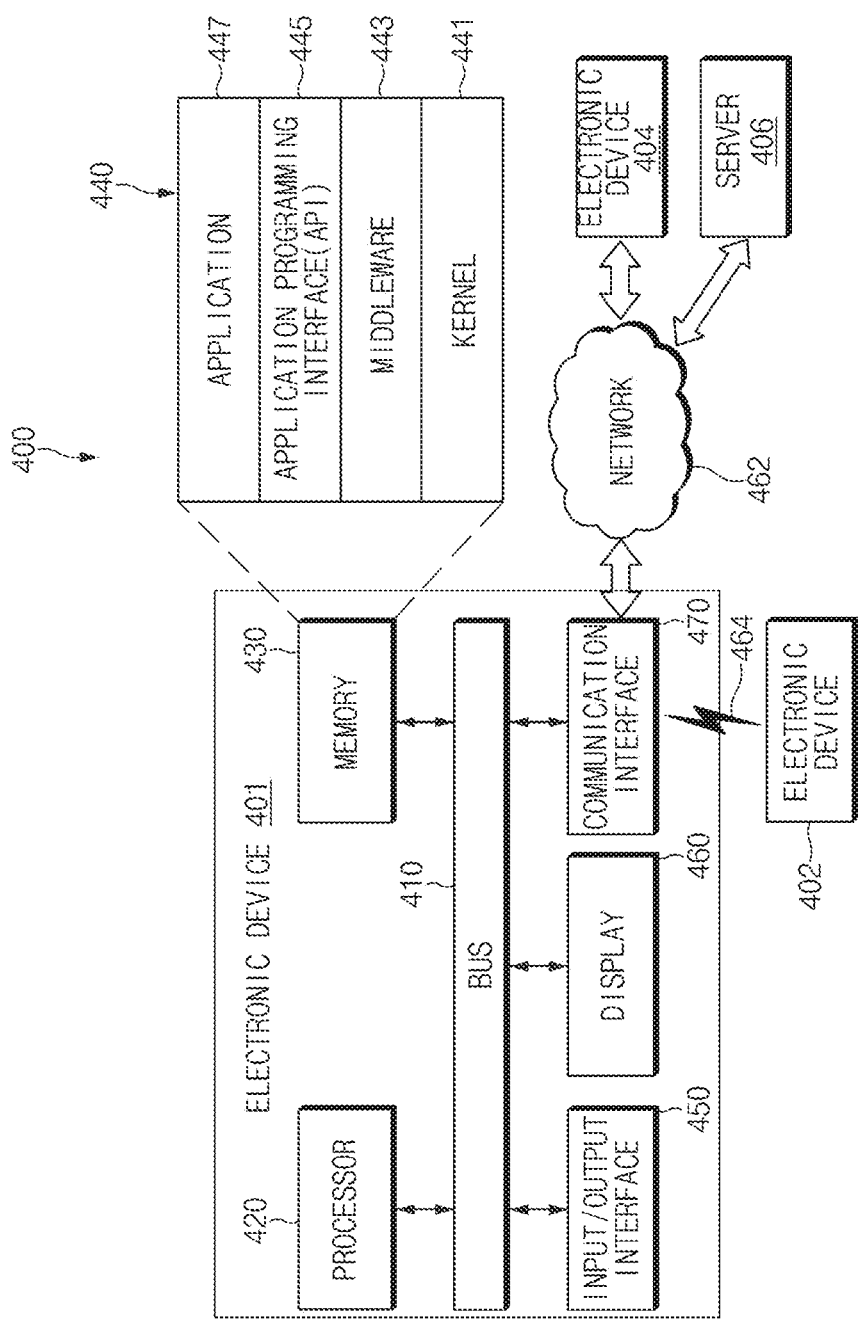
FIG. 4 illustrates an electronic device according to various embodiments of the present disclosure.

FIG. 4 illustrates an electronic device according to various embodiments of the present disclosure.

Referring to FIG. 4, a block diagram of an electronic device 401 according to various embodiments is illustrated.

According to an embodiment, the electronic device 401 may correspond to, for example, an electronic device capable of being mounted in the first electronic device 101 of FIG. 1A or 1B. Alternatively, for example, at least some elements included in the electronic device 401 may be included as a part of the first electronic device 101. In another example, the electronic device 401 may correspond to the second electronic device 102 illustrated in FIG. 1A or 1B.

According to another embodiment, the electronic device 401 may correspond to, for example, the electronic device 250 mounted in the head-mounted display 200a of FIG. 2. Alternatively, for example, at least some elements included in the electronic device 401 may be included as a part of the head-mounted display 200b.

According to various embodiments, an electronic device 401, 402, or 404, or a server 406 may be connected each other over a network 462 or a short range communication 464. The electronic device 401 may include a bus 410, a processor 420, a memory 430, an input/output interface 450, a display 460, and a communication circuit 470. According to an embodiment, the electronic device 401 may not include at least one of the above-described elements or may further include other element(s).

For example, the bus 410 may interconnect the above-described elements 420 to 470 and may include a circuit for conveying communications (e.g., a control message and/or data) among the above-described elements.

The processor 420 may be electrically or operatively connected with other elements 410 to 470 of the electronic device 401 through the bus 410. The processor 420 may include one or more of a central processing unit (CPU), an application processor (AP), or a communication processor (CP). For example, the processor 420 may perform an arithmetic operation or data processing associated with control and/or communication of other elements 410 to 470 by executing various instructions stored in the memory 430.

According to various embodiments, the electronic device 401 may be mounted in the first electronic device 101 illustrated in FIG. 1A or 1B, or may be included as a part of the first electronic device 101. Furthermore, for example, the electronic device 401 may correspond to the electronic device 250 of FIG. 2, or may be included as a part of the head-mounted display 200b. In this case, the processor 420 of the electronic device 401 may decide (or select) at least one graphic rendering scheme, based on a status of the electronic device 401 or the external device (or referred to as an external electronic device) 402 (e.g., the second electronic device 102 of FIG. 1A). The processor 420 may be configured to display contents (e.g., text, images, videos, icons, symbols, or the like) on the display 460 by using the decided graphic rendering scheme.

According to an embodiment, the "status" of the electronic device 401 or the external device 402 may include a specification of the electronic device 401 and the external device 402, a thermal status in the electronic device 401, an overload status of the processor 420, a communication status with the external device 402, or a combination thereof.

According to various embodiments, the "status" of the electronic device 401 or the external device 402 may be expressed as various forms of parameters. For example, the specification of the electronic device 401 and the external device 402 may be expressed as a graphic processing performance parameter (e.g., a clock frequency) of a graphic processing unit included in the electronic device 401 and the external device 402. For example, the thermal status in the electronic device 401 may be expressed as a temperature parameter of the processor 420 that is measured by an internal temperature sensor every specified period. For example, the overload status of the processor 420 may be expressed as a ratio parameter of the current processing overload status to the maximum overload status of the processor 420. Furthermore, for example, the communication status with the external device 402 may be expressed as various forms of communication quality parameters (e.g., cell transfer delay (CTD), cell delay variance (CDV), cell loss ratio (CLR), and the like) and communication traffic parameters (e.g., peak cell rate (PCR), cell delay variation tolerance (CDVT), minimum cell rate (MCR), and the like).

According to an embodiment, the processor 420 of the electronic device 401 may decide (or select) at least one graphic rendering scheme, based on the above-described "status" (parameter). Although an example of a method for deciding a graphic rendering scheme is given blow, the method is not limited to the example below.

For example, if the specification of the electronic device 401 is higher than the specification of the external device 402, the processor 420 may display contents on the display 460 by receiving a graphic command from the external device 402 and executing the received graphic command (the third graphic rendering scheme). In contrast, if the specification of the electronic device 401 is lower than the specification of the external device 402, the processor 420 may display contents on the display 460 by streaming data obtained by executing a graphic command from the external device 402 (the second graphic rendering scheme).

In another example, if the temperature in the electronic device 401 is lower than a specified value, the processor 420 may display contents on the display 460 by receiving a graphic command from the external device 402 and executing the received graphic command (the third graphic rendering scheme). In contrast, if the temperature in the electronic device 401 is higher than the specified value, the processor 420 may display contents on the display 460 by streaming data obtained by executing a graphic command from the external device 402 (the second graphic rendering scheme).

In another example, if the overload status of the processor 420 is lower than a specified value, the processor 420 may display contents on the display 460 by receiving a graphic command from the external device 402 and executing the received graphic command (the third graphic rendering scheme). In contrast, if the overload status of the processor 420 is higher than the specified value, the processor 420 may display contents on the display 460 by streaming data obtained by executing a graphic command from the external device 402 (the second graphic rendering scheme).

In another example, if the quality of communication with the external device 402 is lower than a specified reference, the processor 420 may display contents on the display 460 by receiving a graphic command from the external device 402 and executing the received graphic command (the third graphic rendering scheme). In contrast, if the quality of communication with the external device 402 is higher than the specified reference, the processor 420 may display contents on the display 460 by streaming data obtained by executing a graphic command from the external device 402 (the second graphic rendering scheme).

In another example, if communication traffic with the external device 402 is higher than a specified reference, the processor 420 may display contents on the display 460 by receiving a graphic command from the external device 402 and executing the received graphic command (the third graphic rendering scheme). In contrast, if the communication traffic with the external device 402 is lower than the specified reference, the processor 420 may display contents on the display 460 by streaming data obtained by executing a graphic command from the external device 402 (the second graphic rendering scheme).

In another example, in the case where communication with the external device 402 is interrupted, the processor 420 may compile and convert graphic source data stored in the memory 430 to generate a graphic command. The processor 420 may generate data to be provided to the display 460, for example, by executing the graphic command. The display 460 may display contents, for example, by using the generated data (the first graphic rendering scheme).

According to various embodiments, the contents displayed on the display 460 may correspond to contents (stereoscopic contents) for a stereoscopic image (e.g., 120 of FIG. 1A). For example, the stereoscopic contents may include contents (left-eye image contents) related to a left-eye image (e.g., 120L of FIG. 1A) and contents (right-eye image contents) related to a right-eye image (e.g., 120R of FIG. 1A).

In this case, the processor 420 of the electronic device 401 may differently decide (or select) graphic rendering schemes for displaying the left-eye image contents and the right-eye image contents. For example, the processor 420 may display the left-eye image contents on the display 460 by using one of the above-described first to third graphic rendering schemes and may display the right-eye image contents on the display 460 by using another one of the first to third graphic rendering schemes. The processor 420 may synchronize the left-eye image contents and the right-eye image contents to normally display the contents.

For example, the electronic device 401 and the external device 402 may insert time data or a frame serial number into an index or tag of left-eye and right-eye image frames. For example, the processor 420 of the electronic device 401 may synchronize the left-eye image frame and the right-eye image frame by using the time data or the frame number. The synchronization of the frames may prevent a tearing phenomenon caused by a mismatch between binocular images.

According to various embodiments, the electronic device 401 may correspond to the second electronic device 102 illustrated in FIG. 1A or 1B, and the external device 402 may correspond to the first electronic device 101. In this case, the processor 420 of the electronic device 401 (e.g., the second electronic device 102) may transmit a graphic command or data generated by executing the graphic command to the external device 402, for example, in response to a request of the external device 402 (e.g., the first electronic device 101).

For example, in the case where the external device 402 (e.g., the first electronic device 101) uses the third graphic rendering scheme, the processor 420 of the electronic device 401 (e.g., the second electronic device 102) may encode and transmit a graphic command to the external device 402 in response to a request of the external device 402 (e.g., the first electronic device 101). Furthermore, for example, in the case where the external device 402 (e.g., the first electronic device 101) uses the third graphic rendering scheme, the processor 420 of the electronic device 401 (e.g., the second electronic device 102) may transmit data generated by executing the graphic command to the external device 402 in response to a request of the external device 402 (e.g., the first electronic device 101).

The memory 430 may include a volatile and/or nonvolatile memory. For example, the memory 430 may store commands or data associated with at least one other element(s) of the electronic device 401. According to an embodiment, the memory 430 may store various instructions that, when executed, include operations performed by the processor 420. For example, the memory 430 may store graphic source data of contents and information about a plurality of graphic rendering schemes (e.g., the first to third graphic rendering schemes) for displaying the contents.

According to an embodiment, the memory 430 may store software and/or a program 440. The program 440 may include, for example, a kernel 441, a middleware 443, an application programming interface (API) 445, and/or an application program (or "an application") 447. At least a part of the kernel 441, the middleware 443, or the API 445 may be referred to as an "operating system (OS)".

For example, the kernel 441 may control or manage system resources (e.g., the bus 410, the processor 420, the memory 430, and the like) that are used to execute operations or functions of other programs (e.g., the middleware 443, the API 445, and the application program 447). Furthermore, the kernel 441 may provide an interface that allows the middleware 443, the API 445, or the application program 447 to access discrete elements of the electronic device 401 so as to control or manage system resources.

The middleware 443 may perform, for example, a mediation role such that the API 445 or the application program 447 communicates with the kernel 441 to exchange data.

Furthermore, the middleware 443 may process task requests received from the application program 447 according to a priority. For example, the middleware 443 may assign the priority, which makes it possible to use a system resource (e.g., the bus 410, the processor 420, the memory 430, or the like) of the electronic device 401, to at least one of the application program 447. For example, the middleware 443 may process the one or more task requests according to the priority assigned to the at least one, which makes it possible to perform scheduling or load balancing on the one or more task requests.

The API 445 may be, for example, an interface through which the application program 447 controls a function provided by the kernel 441 or the middleware 443, and may include, for example, at least one interface or function (e.g., an instruction) for a file control, a window control, image processing, a character control, or the like.

The input/output interface 450 may play a role, for example, of an interface which transmits a command or data input from a user or another external device, to other element(s) of the electronic device 401. Furthermore, the input/output interface 450 may output a command or data, received from other element(s) of the electronic device 401, to a user or another external device.

The display 460 may be included in the electronic device 401 or may be operatively connected with the electronic device 401. The display 460 may include, for example, a liquid crystal display (LCD), a light-emitting diode (LED) display, an organic LED (OLED) display, a microelectromechanical systems (MEMS) display, or an electronic paper display. The display 460 may display, for example, various contents (e.g., a text, an image, a video, an icon, a symbol, and the like) to a user. The display 460 may include a touch screen and may receive, for example, a touch, gesture, proximity, or hovering input using an electronic pen or a part of a user's body.

For example, the communication circuit 470 may establish communication between the electronic device 401 and an external device (e.g., the first external electronic device 402, the second external electronic device 404, or the server 406). For example, the communication circuit 470 may be connected to the network 462 over wireless communication or wired communication to communicate with the external device (e.g., the second external electronic device 404 or the server 406).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like, as cellular communication protocol. Furthermore, the wireless communication may include, for example, the short range communication 464. The short range communication 464 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 401 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 462 may include at least one of telecommunications networks, for example, a computer network (e.g., LAN or WAN), an Internet, or a telephone network.

Each of the first and second external electronic devices 402 and 404 may be a device of which the type is different from or the same as that of the electronic device 401. According to an embodiment, the server 406 may include a group of one or more servers. According to various embodiments, all or a portion of operations that the electronic device 401 will perform may be executed by another or plural electronic devices (e.g., the electronic device 402 or 404 or the server 406). According to an embodiment, in the case where the electronic device 401 executes any function or service automatically or in response to a request, the electronic device 401 may not perform the function or the service internally, but, alternatively additionally, it may request at least a portion of a function associated with the electronic device 401 from another device (e.g., the electronic device 402 or 404 or the server 406). The other electronic device may execute the requested function or additional function and may transmit the execution result to the electronic device 401. The electronic device 401 may provide the requested function or service using the received result or may additionally process the received result to provide the requested function or service. To this end, for example, cloud computing, distributed computing, or client-server computing may be used.

Figure 5:
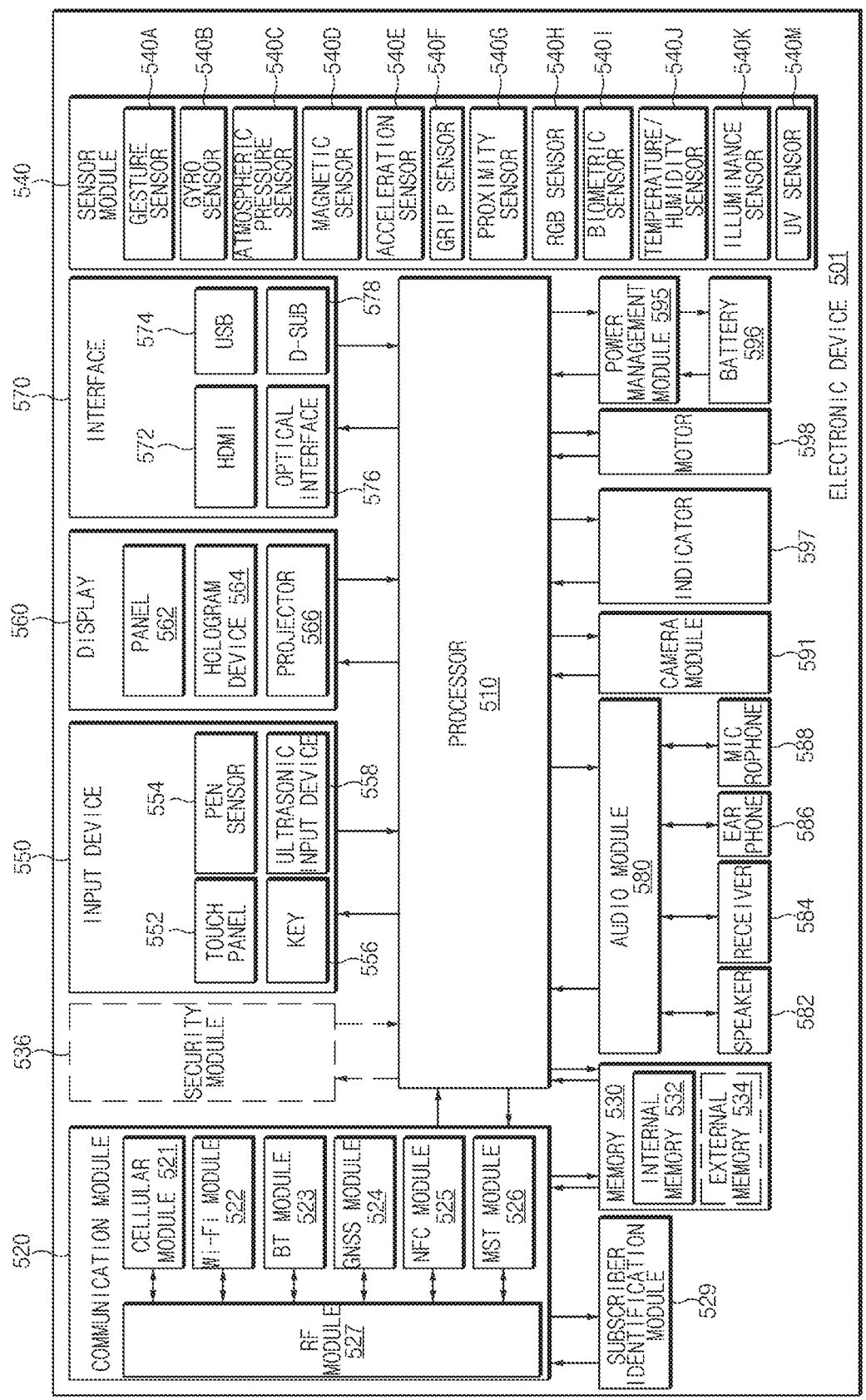
FIG. 5 illustrates a block diagram of an electronic device according to various embodiments.

FIG. 5 illustrates a block diagram of an electronic device, according to various embodiments.

Referring to FIG. 5, an electronic device 501 may include, for example, all or a part of the electronic device 401 illustrated in FIG. 4. The electronic device 501 may include one or more processors (e.g., an application processor (AP)) 510, a communication circuit 520, a subscriber identification module 529, a memory 530, a sensor module 540, an input device 550, a display 560, an interface 570, an audio module 580, a camera module 591, a power management module 595, a battery 596, an indicator 597, and a motor 598.

The processor 510 may drive, for example, an operating system (OS) or an application to control a plurality of hardware or software elements connected to the processor 510 and may process and compute a variety of data. For example, the processor 510 may be implemented with a System on Chip (SoC). According to an embodiment, the processor 510 may further include a graphic processing unit (GPU) and/or an image signal processor. The processor 510 may include at least a part (e.g., a cellular module 521) of elements illustrated in FIG. 5. The processor 510 may load a command or data, which is received from at least one of other elements (e.g., a nonvolatile memory), into a volatile memory and process the loaded command or data. The processor 510 may store a variety of data in the nonvolatile memory.

The communication circuit 520 may be configured the same as or similar to the communication circuit 470 of FIG. 4. The communication circuit 520 may include the cellular module 521, a Wi-Fi module 522, a Bluetooth (BT) module 523, a GNSS module 524 (e.g., a GPS module, a Glonass module, a Beidou module, or a Galileo module), a near field communication (NFC) module 525, a MST module 526 and a radio frequency (RF) module 527.

The cellular module 521 may provide, for example, voice communication, video communication, a character service, an Internet service, or the like over a communication network. According to an embodiment, the cellular module 521 may perform discrimination and authentication of the electronic device 501 within a communication network by using the subscriber identification module (e.g., a SIM card) 529. According to an embodiment, the cellular module 521 may perform at least a portion of functions that the processor 510 provides. According to an embodiment, the cellular module 521 may include a communication processor (CP).

Each of the Wi-Fi module 522, the BT module 523, the GNSS module 524, the NFC module 525, or the MST module 526 may include a processor for processing data exchanged through a corresponding module, for example. According to an embodiment, at least a part (e.g., two or more) of the cellular module 521, the Wi-Fi module 522, the BT module 523, the GNSS module 524, the NFC module 525, or the MST module 526 may be included within one Integrated Circuit (IC) or an IC package.

For example, the RF module 527 may transmit and receive a communication signal (e.g., an RF signal). For example, the RF module 527 may include a transceiver, a power amplifier module (PAM), a frequency filter, a low noise amplifier (LNA), an antenna, or the like. According to another embodiment, at least one of the cellular module 521, the Wi-Fi module 522, the BT module 523, the GNSS module 524, the NFC module 525, or the MST module 526 may transmit and receive an RF signal through a separate RF module.

The subscriber identification module 529 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 530 (e.g., the memory 430) may include an internal memory 532 or an external memory 534. For example, the internal memory 532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 534 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 534 may be operatively and/or physically connected to the electronic device 501 through various interfaces.

A security module 536 may be a module that includes a storage space of which a security level is higher than that of the memory 530 and may be a circuit that guarantees safe data storage and a protected execution environment. The security module 536 may be implemented with a separate circuit and may include a separate processor. For example, the security module 536 may be in a smart chip or a secure digital (SD) card, which is removable, or may include an embedded secure element (eSE) embedded in a fixed chip of the electronic device 501. Furthermore, the security module 536 may operate based on an operating system (OS) that is different from the OS of the electronic device 501. For example, the security module 536 may operate based on java card open platform (JCOP) OS.

The sensor module 540 may measure, for example, a physical quantity or may detect an operation state of the electronic device 501. The sensor module 540 may convert the measured or detected information to an electric signal. For example, the sensor module 540 may include at least one of a gesture sensor 540A, a gyro sensor 540B, a barometric pressure sensor 540C, a magnetic sensor 540D, an acceleration sensor 540E, a grip sensor 540F, the proximity sensor 540G, a color sensor 540H (e.g., red, green, blue (RGB) sensor), a biometric sensor 540I, a temperature/humidity sensor 540J, an illuminance sensor 540K, or an UV sensor 540M. Although not illustrated, additionally or alternatively, the sensor module 540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 540 may further include a control circuit for controlling at least one or more sensors included therein. According to an embodiment, the electronic device 501 may further include a processor that is a part of the processor 510 or independent of the processor 510 and is configured to control the sensor module 540. The processor may control the sensor module 540 while the processor 510 remains at a sleep state.

The input device 550 may include, for example, a touch panel 552, a (digital) pen sensor 554, a key 556, or an ultrasonic input unit 558. For example, the touch panel 552 may use at least one of capacitive, resistive, infrared and ultrasonic detecting methods. Also, the touch panel 552 may further include a control circuit. The touch panel 552 may further include a tactile layer to provide a tactile reaction to a user.

The (digital) pen sensor 554 may be, for example, a part of a touch panel or may include an additional sheet for recognition. The key 556 may include, for example, a physical button, an optical key, a keypad, or the like. The ultrasonic input device 558 may detect (or sense) an ultrasonic signal, which is generated from an input device, through a microphone (e.g., a microphone 588) and may check data corresponding to the detected ultrasonic signal.

The display 560 (e.g., the display 460) may include a panel 562, a hologram device 564, or a projector 566. The panel 562 may be the same as or similar to the display 460 illustrated in FIG. 4. The panel 562 may be implemented, for example, to be flexible, transparent or wearable. The panel 562 and the touch panel 552 may be integrated into a single module. The hologram device 564 may display a stereoscopic image in a space using a light interference phenomenon. The projector 566 may project light onto a screen so as to display an image. For example, the screen may be arranged in the inside or the outside of the electronic device 501. According to an embodiment, the display 560 may further include a control circuit for controlling the panel 562, the hologram device 564, or the projector 566.

The interface 570 may include, for example, a high-definition multimedia interface (HDMI) 572, a universal serial bus (USB) 574, an optical interface 576, or a D-subminiature (D-sub) 578. The interface 570 may be included, for example, in the communication circuit 470 illustrated in FIG. 4. Additionally or alternatively, the interface 570 may include, for example, a mobile high definition link (MHL) interface, a SD card/multi-media card (MMC) interface, or an infrared data association (IrDA) standard interface.

The audio module 580 may convert a sound and an electric signal in dual directions. At least a part of the audio module 580 may be included, for example, in the input/output interface 450 illustrated in FIG. 4. The audio module 580 may process, for example, sound information that is input or output through a speaker 582, a receiver 584, an earphone 586, or the microphone 588.

For example, the camera module 591 may shoot a still image or a video. According to an embodiment, the camera module 591 may include at least one or more image sensors (e.g., a front sensor or a rear sensor), a lens, an image signal processor (ISP), or a flash (e.g., an LED or a xenon lamp).

The power management module 595 may manage, for example, power of the electronic device 501. According to an embodiment, a power management integrated circuit (PMIC), a charger IC, or a battery or fuel gauge may be included in the power management module 595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 596 and a voltage, current or temperature thereof while the battery is charged. The battery 596 may include, for example, a rechargeable battery and/or a solar battery.

The indicator 597 may display a specific state of the electronic device 501 or a part thereof (e.g., the processor 510), such as a booting state, a message state, a charging state, and the like. The motor 598 may convert an electrical signal into a mechanical vibration and may generate the following effects: vibration, haptic, and the like. Although not illustrated, a processing device (e.g., a GPU) for supporting a mobile TV may be included in the electronic device 501. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In various embodiments, the electronic device may include at least one of the above-mentioned elements, and some elements may be omitted or other additional elements may be added. Furthermore, some of the elements of the electronic device according to various embodiments may be combined with each other so as to form one entity, so that the functions of the elements may be performed in the same manner as before the combination.

Figure 6:
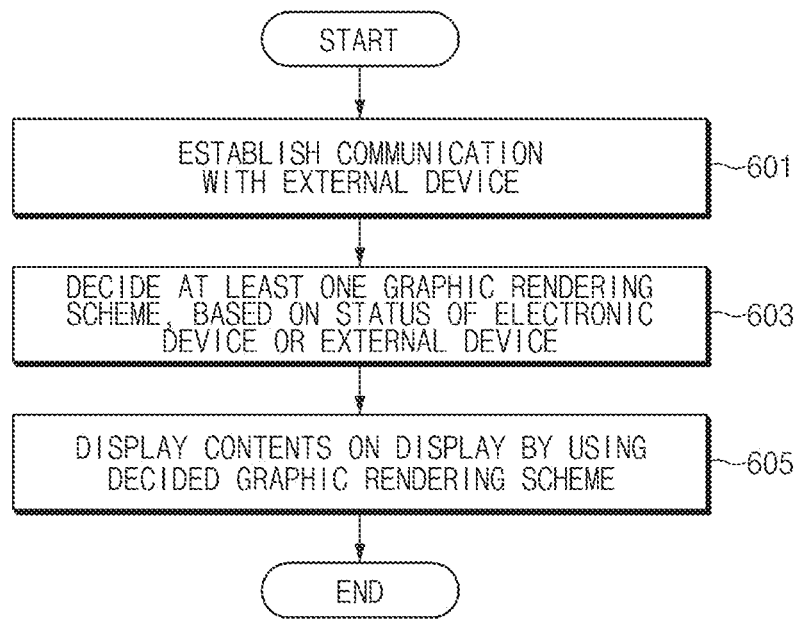
FIG. 6 illustrates a flowchart of a contents display method according to an embodiment.

FIG. 6 illustrates a flowchart of a contents display method according to an embodiment.

Referring to FIG. 6, a contents display method according to an embodiment may include operations 601 to 605. Operations 601 to 605 may be performed by, for example, the first electronic device 101 of FIGS. 1A and 1B, the head-mounted display 200a or 200b of FIG. 2, the electronic device 401 of FIG. 4, or the electronic device 501 of FIG. 5.

Operations 601 to 605 may be implemented with, for example, instructions performed (or executed) by the processor of the electronic device. The instructions may be stored in, for example, a computer-readable storage medium or the memory 430 of the electronic device 401 illustrated in FIG. 4. The reference numerals in FIG. 4 will be used in the following description of operations 601 to 605.

In operation 601, the processor 420 of the electronic device 401 may establish communication with the external device 402 through the communication circuit 470. For example, the electronic device 401 may detect the external device 402 or may connect to the detected external device 402. Since the communication between the electronic device 401 and the external device 402 is established, the two devices 401 and 402 may interact with each other.

In operation 603, the processor 420 of the electronic device 401 may decide (or select) at least one of a plurality of graphic rendering schemes stored in the memory 430, based on a "status" of the electronic device 401 or the external device 402.

According to an embodiment, the "status" of the electronic device 401 or the external device 402 may include a specification of the electronic device 401 and the external device 402, a thermal status in the electronic device 401, an overload status of the processor 420 of the electronic device 401, a communication status with the external device 402, or a combination thereof.

The plurality of graphic rendering schemes may include, for example, a scheme (a first graphic rendering scheme) to display contents on the display 460 by converting graphic source data stored in the memory 430 into a graphic command and executing the graphic command.

Furthermore, for example, the plurality of graphic rendering scheme may include a scheme (a second graphic rendering scheme) to display contents on the display 460 by streaming data obtained by executing a graphic command from the external device 402.

In addition, for example, the plurality of graphic rendering schemes may include a scheme (a third graphic rendering scheme) to display contents on the display 460 by receiving a graphic command from the external device 402 and executing the received graphic command.

According to an embodiment, the first to third graphic rendering schemes may be combined together. For example, in the case where contents to be displayed on the display 460 correspond to stereoscopic contents that include left-eye image contents and right-eye image contents, the electronic device 401 may differently decide graphic rendering schemes for displaying the left-eye image contents and the right-eye image contents. In this case, the electronic device 401 may display, on the display 460, the left-eye image contents and the right-eye image contents synchronized with each other.

In operation 605, the processor 420 of the electronic device 401 may display contents on the display 460 operatively connected thereto, by using the graphic rendering scheme decided in operation 603.

Figure 7:
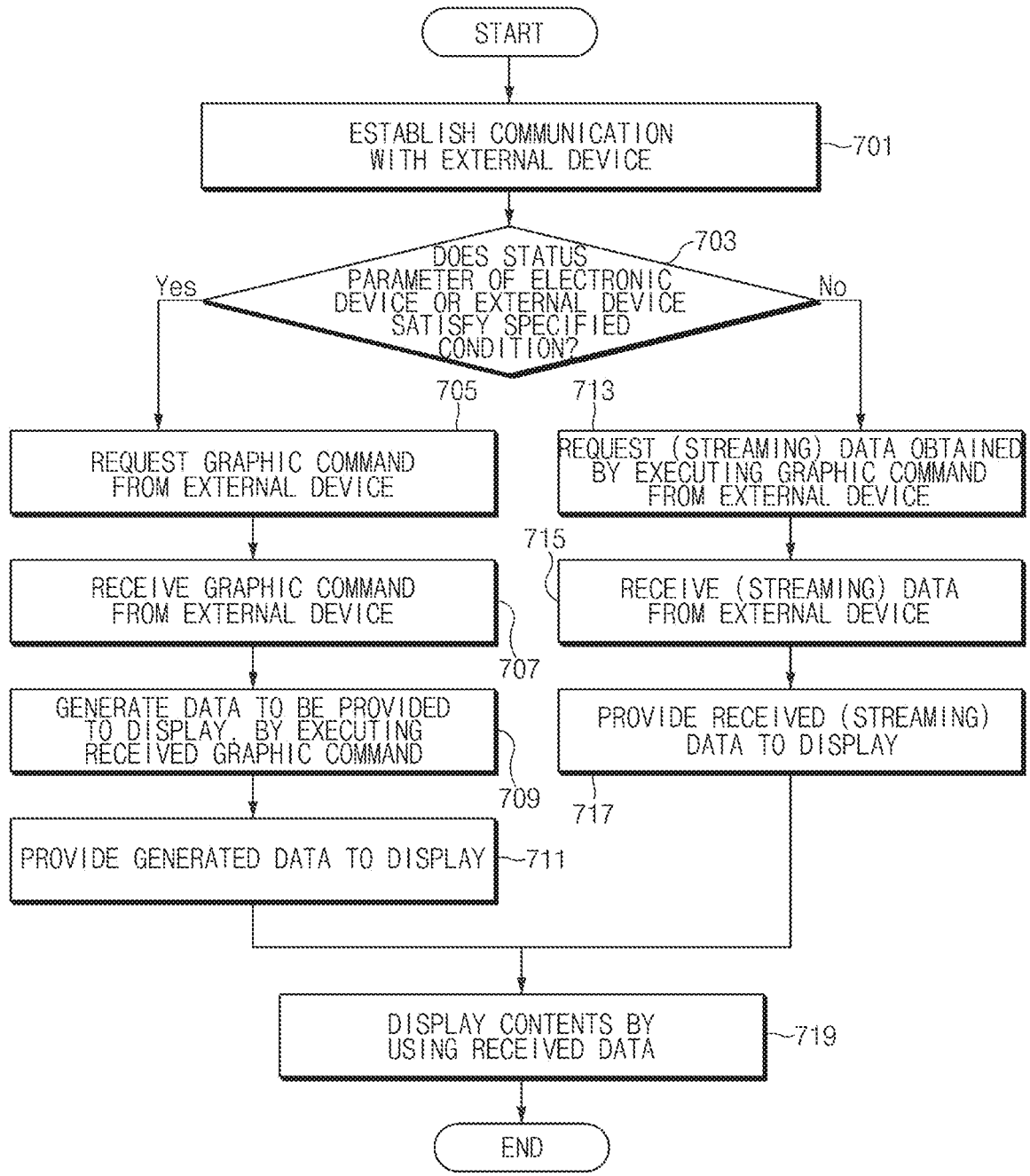
FIG. 7 illustrates a flowchart of a contents display method according to another embodiment.

FIG. 7 illustrates a flowchart of a contents display method according to another embodiment.

Referring to FIG. 7, a contents display method according to an embodiment may include operations 701 to 719. Operations 701 to 719 may be performed by, for example, the electronic device 401 illustrated in FIG. 4. Operations 701 to 719 may be implemented with instructions performed (or executed) by the processor 420 of the electronic device 401. The instructions may be stored in, for example, a computer-readable storage medium or the memory 430 of the electronic device 401. The reference numerals in FIG. 4 will be used in the following description of operations 701 to 719, and repetitive descriptions in connection with FIG. 6 may be omitted.

In operation 701, the processor 420 of the electronic device 401 may establish communication with the external device 402 by using the communication circuit 470.

In operation 703, the processor 420 of the electronic device 401 may determine whether a status parameter of the electronic device 401 or the external device 402 satisfies a specified condition. Based on the determination, the processor 420 may decide (or select) at least one of a plurality of graphic rendering schemes stored in the memory 430.

For example, in the case where the specified condition is satisfied (Yes in operation 703), the processor 420 may decide to use a third graphic rendering scheme (e.g., operations 705 to 711). In contrast, in the case where the specified condition is not satisfied (No in operation 703), the processor 420 may decide to use a second graphic rendering scheme (e.g., operations 713 to 717).

According to an embodiment, the specified condition may be set based on a specification of the electronic device 401 and the external device 402, a thermal status in the electronic device 401, an overload status of the processor 420 included in the electronic device 401, a communication status with the external device 402, or a combination thereof.

In operation 705, the processor 420 of the electronic device 401 may request a graphic command for predetermined contents from the external device 402 through the communication circuit 470.

In operation 707, the processor 420 of the electronic device 401 may receive the graphic command, which the processor 420 has requested in operation 705, from the external device 402 through the communication circuit 470.

In operation 709, the processor 420 of the electronic device 401 may execute the graphic command received in operation 707 to generate data to be provided to the display 460.

In operation 711, the processor 420 of the electronic device 401 may provide the data generated in operation 709 to the display 460.

In operation 713, the processor 420 of the electronic device 401 may request (streaming) data obtained by executing a graphic command from the external device 402 through the communication circuit 470.

In operation 715, the processor 420 of the electronic device 401 may receive the (streaming) data, which the processor 420 has requested in operation 713, from the external device 402 through the communication circuit 470.

In operation 717, the processor 420 of the electronic device 401 may provide the (streaming) data received in operation 715 to the display 460.

In operation 719, the display 460 operatively connected to the electronic device 401 may display contents by using the data provided in operation 711 or 717, under the control of the processor 420.

According to an embodiment, if it is determined in operation 703 that the specification of the electronic device 401 is higher than the specification of the external device 402 (Yes in operation 703), the electronic device 401 may decide to use the third graphic rendering scheme (e.g., operations 705 to 711). In contrast, if it is determined that the specification of the electronic device 401 is lower than (or equal to) the specification of the external device 402 (No in operation 703), the electronic device 401 may decide to use the second graphic rendering scheme (e.g., operations 713 to 717).

Although not illustrated in FIG. 7, the electronic device 401 may decide to use a first graphic rendering scheme, for example, in the case where the specification of the external device 402 is determined to be very low or the specification of the electronic device 401 is determined to be sufficient for independent graphic rendering.

According to another embodiment, if it is determined in operation 703 that the temperature in the electronic device 401 is lower than a specified value (a first specified value) (Yes in operation 703), the electronic device 401 may decide to use the third graphic rendering scheme (e.g., operations 705 to 711). In contrast, if it is determined that the temperature in the electronic device 401 is higher than (or equal to) the specified value (No in operation 703), the electronic device 401 may decide to use the second graphic rendering scheme (e.g., operations 713 to 717).

Although not illustrated in FIG. 7, the electronic device 401 may also decide to use the first graphic rendering scheme, for example, in the case where the inner temperature is determined to be lower than another specified value (a second specified value, for example, a value lower than the first specified value).

According to another embodiment, if it is determined in operation 703 that the overload status of the processor 420 included in the electronic device 401 is lower than a specified value (a first specified value) (Yes in operation 703), the electronic device 401 may decide to use the third graphic rendering scheme (e.g., operations 705 to 711). In contrast, if it is determined that the overload status of the processor 420 included in the electronic device 401 is higher than (or equal to) the specified value (No in operation 703), the electronic device 401 may decide to use the second graphic rendering scheme (e.g., operations 713 to 717).

Although not illustrated in FIG. 7, the electronic device 401 may also decide to use the first graphic rendering scheme, for example, in the case where the overload status of the processor 420 is determined to be lower than another specified value (a second specified value, for example, a value lower than the first specified value).

According to another embodiment, if it is determined in operation 703 that the quality of communication with the external device 402 is lower than a specified reference (a first specified reference) (Yes in operation 703), the electronic device 401 may decide to use the third graphic rendering scheme (e.g., operations 705 to 711). In contrast, if it is determined that the quality of communication with the external device 402 is higher than (or equal to) the specified reference (No in operation 703), the electronic device 401 may decide to use the second graphic rendering scheme (e.g., operations 713 to 717).

Although not illustrated in FIG. 7, the electronic device 401 may also decide to use the first graphic rendering scheme, for example, in the case where the communication quality is determined to be lower than another specified reference (a second specified reference, for example, a reference lower than the first specified reference).

According to another embodiment, if it is determined in operation 703 that the communication traffic with the external device 402 is higher than a specified reference (a first specified reference) (Yes in operation 703), the electronic device 401 may decide to use the third graphic rendering scheme (e.g., operations 705 to 711). In contrast, if it is determined that the communication traffic with the external device 402 is lower than (or equal to) the specified reference (No in operation 703), the electronic device 401 may decide to use the second graphic rendering scheme (e.g., operations 713 to 717).

Although not illustrated in FIG. 7, the electronic device 401 may also decide to use the first graphic rendering scheme, for example, in the case where the communication traffic is determined to be higher than another specified reference (a second specified reference, for example, a reference higher than the first specified reference).

According to another embodiment, the electronic device 401 may decide to use the first graphic rendering scheme in the case where, in operation 701, the electronic device 401 fails to establish communication with the external device 402.

According to various embodiments of the present disclosure, an electronic device may dynamically decide the most suitable graphic rendering scheme, based on a status (e.g., a specification, a thermal status, an overload status, a communication status, or a combination thereof) of the electronic device and/or an external device.

As described above, an electronic device according to an embodiment may include a communication circuit for establishing communication with an external electronic device, a memory for storing graphic source data of contents and information about a plurality of graphic rendering schemes for displaying the contents, and a processor operatively connected to the communication circuit and the memory. The processor may be configured to select at least one of the plurality of graphic rendering schemes, based on a status of the electronic device or the external electronic device and to display the contents on a display operatively connected to the electronic device, by using the at least one graphic rendering scheme.

In the electronic device according to another embodiment, the plurality of graphic rendering schemes may include a scheme to display the contents on the display by converting the graphic source data stored in the memory into a graphic command and executing the graphic command.

In the electronic device according to another embodiment, the plurality of graphic rendering schemes may include a scheme to display the contents on the display by receiving a graphic command from the external electronic device and executing the graphic command.

In the electronic device according to another embodiment, the plurality of graphic rendering schemes may include a scheme to display the contents on the display by streaming data obtained by executing a graphic command from the external electronic device through the communication circuit.

In the electronic device according to another embodiment, the contents may include stereoscopic contents that include left-eye image contents and right-eye image contents. The processor may be configured to differently select graphic rendering schemes for displaying the left-eye image contents and the right-eye image contents.

In the electronic device according to another embodiment, the processor may be configured to display, on the display, the left-eye image contents and the right-eye image contents synchronized with each other.

In the electronic device according to another embodiment, the processor may be configured to select the at least one graphic rendering scheme, based on a specification of the electronic device or the external electronic device, a thermal status in the electronic device, an overload status of the processor, a communication status with the external electronic device, or a combination thereof.

In the electronic device according to another embodiment, the processor may be configured to display the contents on the display by receiving a graphic command from the external electronic device and executing the received graphic command when the specification of the electronic device is higher than the specification of the external electronic device and to display the contents on the display by streaming data obtained by executing the graphic command from the external electronic device through the communication circuit when the specification of the electronic device is lower than the specification of the external electronic device.

In the electronic device according to another embodiment, the processor may be configured to display the contents on the display by receiving a graphic command from the external electronic device and executing the received graphic command when a temperature in the electronic device is lower than a specified value and to display the contents on the display by streaming data obtained by executing the graphic command from the external electronic device through the communication circuit when the temperature in the electronic device is higher than the specified value.

In the electronic device according to another embodiment, the processor may be configured to display the contents on the display by receiving a graphic command from the external electronic device and executing the received graphic command when the overload status of the processor is lower than a specified value and to display the contents on the display by streaming data obtained by executing the graphic command from the external electronic device through the communication circuit when the overload status of the processor is higher than the specified value.

In the electronic device according to another embodiment, the processor may be configured to display the contents on the display by receiving a graphic command from the external electronic device and executing the received graphic command when quality of the communication with the external electronic device is lower than a specified reference and to display the contents on the display by streaming data obtained by executing the graphic command from the external electronic device through the communication circuit when the quality of the communication with the external electronic device is higher than the specified reference.

In the electronic device according to another embodiment, the processor may be configured to display the contents on the display by receiving a graphic command from the external electronic device and executing the received graphic command when communication traffic with the external electronic device is higher than a specified reference and to display the contents on the display by streaming data obtained by executing the graphic command from the external electronic device through the communication circuit when the communication traffic with the external electronic device is lower than the specified reference.

A method implemented with a processor according to an embodiment, in which an electronic device includes the processor, a communication module, and a memory for storing information about a plurality of graphic rendering schemes, may include establishing communication with an external electronic device by using the communication module, selecting at least one of the plurality of graphic rendering schemes, based on a status of the electronic device and the external electronic device, by using the processor, and displaying contents on a display operatively connected to the electronic device, by using the at least one graphic rendering scheme.

In the method according to another embodiment, the at least one graphic rendering scheme may include a scheme to display the contents on the display by converting graphic source data stored in the electronic device into a graphic command and executing the graphic command.

In the method according to an embodiment, the at least one graphic rendering scheme may include a scheme to display the contents on the display by receiving a graphic command from the external electronic device and executing the received graphic command.

In the method according to an embodiment, the at least one graphic rendering scheme may include a scheme to display the contents on the display by streaming data obtained by executing a graphic command from the external electronic device.

In the method according to another embodiment, the contents may include stereoscopic contents that include left-eye image contents and right-eye image contents, and the selecting may include differently selecting graphic rendering schemes for displaying the left-eye image contents and the right-eye image contents.

In the method according to another embodiment, the displaying may include synchronizing the left-eye image contents and the right-eye image contents.

In the method according to another embodiment, the selecting may include selecting the at least one graphic rendering scheme, based on a specification of the electronic device and the external electronic device, a thermal status in the electronic device, an overload status of the processor, a communication status with the external electronic device, or a combination thereof.

A computer-readable storage medium according to an embodiment may store an instruction that, when executed, causes at least one processor to establish communication with an external electronic device, to select at least one graphic rendering scheme, based on a status of the electronic device and the external electronic device, and to display contents on a display operatively connected to the electronic device, by using the at least one graphic rendering scheme.

Figure 8:
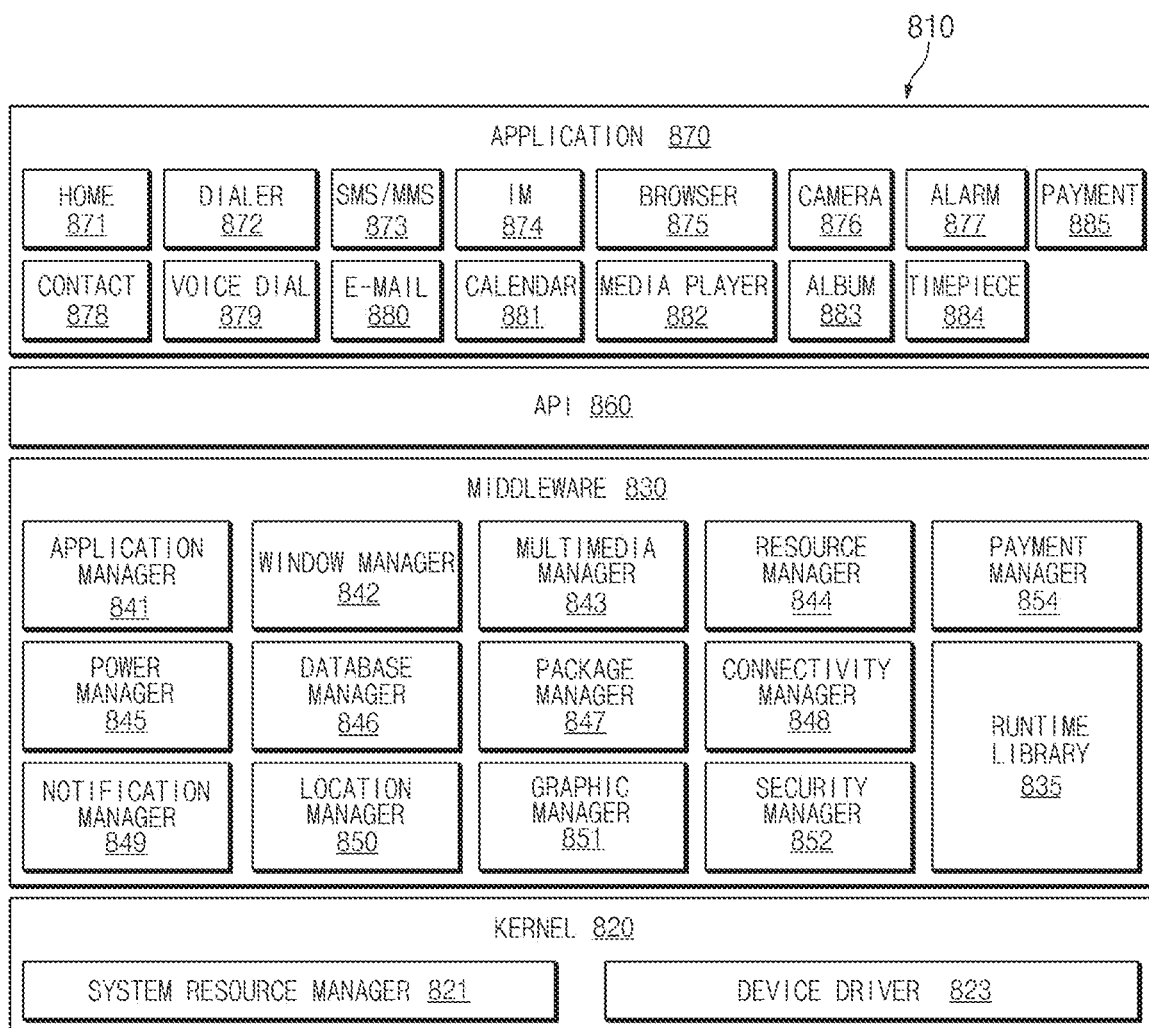
FIG. 8 illustrates a block diagram of a program module according to various embodiments.

FIG. 8 illustrates a block diagram of a program module, according to various embodiments.

Referring to FIG. 8, a program module 810 (e.g., the program 440) may include an operating system (OS) to control resources associated with an electronic device (e.g., the electronic device 401), and/or diverse applications (e.g., the application program 447) driven on the OS. The OS may be, for example, Android™, iOS™, Windows™, Symbian™, Tizen™, or Bada™.

The program module 810 may include a kernel 820, a middleware 830, an application programming interface (API) 860, and/or an application 870. At least a portion of the program module 810 may be preloaded on an electronic device or may be downloadable from an external electronic device (e.g., the first electronic device 402, the second electronic device 404, the server 406, or the like).

The kernel 820 (e.g., the kernel 441) may include, for example, a system resource manager 821 or a device driver 823. The system resource manager 821 may perform control, allocation, or retrieval of system resources. According to an embodiment, the system resource manager 821 may include a process managing unit, a memory managing unit, or a file system managing unit. The device driver 823 may include, for example, a display driver, a camera driver, a Bluetooth driver, a shared memory driver, a USB driver, a keypad driver, a Wi-Fi driver, an audio driver, or an inter-process communication (IPC) driver.

The middleware 830 may provide, for example, a function that the application 870 needs in common, or may provide diverse functions to the application 870 through the API 860 to allow the application 870 to efficiently use limited system resources of the electronic device. According to an embodiment, the middleware 830 (e.g., the middleware 443) may include at least one of a runtime library 835, an application manager 841, a window manager 842, a multimedia manager 843, a resource manager 844, a power manager 845, a database manager 846, a package manager 847, a connectivity manager 848, a notification manager 849, a location manager 850, a graphic manager 851, a security manager 852, or a payment manager 854.

The runtime library 835 may include, for example, a library module that is used by a compiler to add a new function through a programming language while the application 870 is being executed. The runtime library 835 may perform input/output management, memory management, or capacities about arithmetic functions.

The application manager 841 may manage, for example, a life cycle of at least one application of the application 870. The window manager 842 may manage a graphic user interface (GUI) resource that is used in a screen. The multimedia manager 843 may identify a format necessary for playing diverse media files, and may perform encoding or decoding of media files by using a codec suitable for the format. The resource manager 844 may manage resources such as a storage space, memory, or source code of at least one application of the application 870.

The power manager 845 may operate, for example, with a basic input/output system (BIOS) to manage a battery or power, and may provide power information for an operation of an electronic device. The database manager 846 may generate, search for, or modify database that is to be used in at least one application of the application 870. The package manager 847 may install or update an application that is distributed in the form of package file.

The connectivity manager 848 may manage, for example, wireless connection such as Wi-Fi or Bluetooth. The notification manager 849 may display or notify an event such as arrival message, appointment, or proximity notification in a mode that does not disturb a user. The location manager 850 may manage location information about an electronic device. The graphic manager 851 may manage a graphic effect that is provided to a user, or manage a user interface relevant thereto. The security manager 852 may provide a general security function necessary for system security, user authentication, or the like. According to an embodiment, in the case where an electronic device (e.g., the electronic device 401) includes a telephony function, the middleware 830 may further include a telephony manager for managing a voice or video call function of the electronic device.

The middleware 830 may include a middleware module that combines diverse functions of the above-described elements. The middleware 830 may provide a module specialized to each OS kind to provide differentiated functions. Additionally, the middleware 830 may dynamically remove a part of the preexisting elements or may add new elements thereto.

The API 860 (e.g., the API 445) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 870 (e.g., the application program 447) may include, for example, one or more applications capable of providing functions for a home 871, a dialer 872, an SMS/MMS 873, an instant message (IM) 874, a browser 875, a camera 876, an alarm 877, a contact 878, a voice dial 879, an e-mail 880, a calendar 881, a media player 882, an album 883, a timepiece 884, and a payment 885 or for offering health care (e.g., measuring an exercise quantity, blood sugar, or the like) or environment information (e.g., information of barometric pressure, humidity, temperature, or the like).

According to an embodiment, the application 870 may include an application (hereinafter referred to as "information exchanging application" for descriptive convenience) to support information exchange between an electronic device (e.g., the electronic device 401) and an external electronic device (e.g., the electronic device 402 or 404). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 402 or 404). Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device (e.g., the electronic device 402 or 404) which communicates with the electronic device, an application running in the external electronic device, or a service (e.g., a call service, a message service, or the like) provided from the external electronic device.

According to an embodiment, the application 870 may include an application (e.g., a health care application of a mobile medical device) that is assigned in accordance with an attribute of an external electronic device (e.g., the electronic device 402 or 404). According to an embodiment, the application 870 may include an application that is received from an external electronic device (e.g., the server 406 or the electronic device 402 or 404). According to an embodiment, the application 870 may include a preloaded application or a third party application that is downloadable from a server. The names of elements of the program module 810 according to the embodiment may be modifiable depending on kinds of operating systems.

According to various embodiments, at least a portion of the program module 810 may be implemented by software, firmware, hardware, or a combination of two or more thereof. At least a portion of the program module 810 may be implemented (e.g., executed), for example, by the processor (e.g., the processor 510). At least a portion of the program module 810 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 420), may cause the one or more processors to perform a function corresponding to the instruction. The computer-readable storage media, for example, may be the memory 430.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a communication circuit to establish communication with an external electronic device;
a memory to store graphic source data of contents and information about a plurality of graphic rendering schemes for displaying the contents, each of the plurality of graphic rendering schemes having different computing resource requirements and network resource requirements; and
at least one processor operatively connected to the communication circuit and the memory,
wherein the at least one processor is configured to:
select at least one graphic rendering scheme, among the plurality of graphic rendering schemes based on whether a status of the electronic device and a status of the external electronic device satisfies a specified condition or not,
display the contents on a display operatively connected to the electronic device, by using data which is obtained based on the selected at least one graphic rendering scheme,
in response to identifying that the status of the electronic device and a status of the external electronic device satisfies the specified condition, select a first graphic rendering scheme to generate the data by receiving a graphic command from the external electronic device and executing the received graphic command, and
in response to identifying that the status of the electronic device and a status of the external electronic device does not satisfies the specified condition, select a second graphic rendering scheme to receive the data which is generated by the external electronic device,
wherein the contents comprise stereoscopic contents that include left-eye image contents and right-eye image contents, and
wherein the at least one processor is further configured to differently select graphic rendering schemes for displaying the left-eye image contents and the right-eye image contents.

2. The electronic device of claim 1, wherein the at least one processor is further configured to display, on the display, the left-eye image contents and the right-eye image contents synchronized with each other.

3. The electronic device of claim 1, wherein the at least one processor is further configured to select the at least one graphic rendering scheme, based on a specification of the electronic device or the external electronic device, a thermal status in the electronic device, an overload status of the processor, a communication status with the external electronic device, or a combination thereof.

4. The electronic device of claim 3, wherein, based on a difference between the electronic device and the external electronic device, the at least one processor is further configured to display the contents on the display by at least one of:
receiving a graphic command from the external electronic device and executing the received graphic command, or
streaming data obtained by executing the graphic command from the external electronic device through the communication circuit.

5. The electronic device of claim 3, wherein the at least one processor is further configured to:
display the contents on the display by receiving a graphic command from the external electronic device and executing the received graphic command when a temperature in the electronic device is lower than a specified value; and
display the contents on the display by streaming data obtained by executing the graphic command from the external electronic device through the communication circuit when the temperature in the electronic device is higher than the specified value.

6. The electronic device of claim 3, wherein the at least one processor is further configured to:
display the contents on the display by receiving a graphic command from the external electronic device and executing the received graphic command when the overload status of the at least one processor is lower than a specified value; and display the contents on the display by streaming data obtained by executing the graphic command from the external electronic device through the communication circuit when the overload status of the at least one processor is higher than the specified value.

7. The electronic device of claim 3, wherein the at least one processor is further configured to:
display the contents on the display by receiving a graphic command from the external electronic device and executing the received graphic command when quality of the communication with the external electronic device is lower than a specified reference; and
display the contents on the display by streaming data obtained by executing the graphic command from the external electronic device through the communication circuit when the quality of the communication with the external electronic device is higher than the specified reference.

8. The electronic device of claim 3, wherein the at least one processor is further configured to:
display the contents on the display by receiving a graphic command from the external electronic device and executing the received graphic command when communication traffic with the external electronic device is higher than a specified reference; and
display the contents on the display by streaming data obtained by executing the graphic command from the external electronic device through the communication circuit when the communication traffic with the external electronic device is lower than the specified reference.

9. The electronic device of claim 1, wherein the at least one processor is further configured to dynamically determine a most suitable graphic rendering scheme, among the plurality of graphic rendering schemes, based on at least one of a thermal status, an overload status, or a communication status of the electronic device and the external electronic device.

10. A method implemented with at least one processor, in which an electronic device includes the at least one processor, a communication module, and a memory to store information about a plurality of graphic rendering schemes, the method comprising:

establishing communication with an external electronic device, by using the communication module
selecting, by the at least one processor, at least one graphic rendering scheme, among the plurality of graphic rendering schemes based on whether a status of the electronic device and a status of the external electronic device satisfies specified condition or not; and
controlling, by the at least one processor, a display, operatively connected to the electronic device, to display contents by using data which is obtained based on the selected at least one graphic rendering scheme,
wherein each of the plurality of graphic rendering schemes having different computing resource requirements and network resource requirements,
wherein selecting of the at least one graphic rendering scheme comprises:
in response to identifying that the status of the electronic device and a status of the external electronic device satisfies the specified condition, selecting a first graphic rendering scheme to generate the data by receiving a graphic command from the external electronic device and executing the received graphic command, and
in response to identifying that the status of the electronic device and a status of the external electronic device does not satisfies the specified condition, selecting a second graphic rendering scheme to receive the data which is generated by the external electronic device,
wherein the contents comprise stereoscopic contents that include left-eye image contents and right-eye image contents, and
wherein graphic rendering schemes for displaying the left-eye image contents and the right-eye image contents are differently selected.

11. The method of claim 10, further comprising:
dynamically determining a most suitable graphic rendering scheme, among the plurality of graphic rendering schemes, based on at least one of a thermal status, an overload status, or a communication status of the electronic device and the external electronic device.

* * * * *